US009793050B2

(12) United States Patent
Inazumi et al.

(10) Patent No.: US 9,793,050 B2
(45) Date of Patent: Oct. 17, 2017

(54) CAPACITOR AND INVERTER (71) Applicant: PANASONIC INTELLECTUAL PROPERTY MANAGEMENT CO., LTD., Osaka (JP)

(72) Inventors: Takuya Inazumi, Toyama (JP); Toshiro Mayumi, Tokyo (JP)

(73) Assignee: PANASONIC INTELLECTUAL PROPERTY MANAGEMENT CO., LTD., Osaka (JP)

(\*) Notice: Subject to any disclaimer, the term of this patent is extended or adjusted under 35 U.S.C. 154(b) by 99 days.

(21) Appl. No.: 14/962,812

(22) Filed: Dec. 8, 2015

(65) Prior Publication Data

US 2016/0163460 A1 Jun. 9, 2016

(30) Foreign Application Priority Data

Dec. 8, 2014 (JP) ................................. 2014-248265

(51) Int. Cl.
*H01G 4/228* (2006.01)
*H02M 7/00* (2006.01)
*H01G 4/40* (2006.01)

(52) U.S. Cl.
CPC ............ *H01G 4/228* (2013.01); *H01G 4/40* (2013.01); *H02M 7/003* (2013.01); *Y02T 10/7022* (2013.01)

(58) Field of Classification Search
None
See application file for complete search history.

(56) References Cited

U.S. PATENT DOCUMENTS

| | | | | |
|---|---|---|---|---|
| 2011/0110021 A1* | 5/2011 | Vanhyfte | ............. | H05K 7/1432 361/608 |
| 2012/0300522 A1* | 11/2012 | Tokuyama | ............ | H01L 25/072 363/131 |
| 2013/0279114 A1* | 10/2013 | Nishikimi | ................ | B60K 6/28 361/699 |
| 2014/0078803 A1* | 3/2014 | Nishihara | ............. | H02M 7/003 363/141 |
| 2015/0223366 A1* | 8/2015 | Horiuchi | ............... | H02M 7/003 361/689 |
| 2016/0268921 A1* | 9/2016 | Feuerstack | ............. | H01G 9/008 |

FOREIGN PATENT DOCUMENTS

JP 2007-012769 A 1/2007

\* cited by examiner

*Primary Examiner* — Dion R Ferguson
(74) *Attorney, Agent, or Firm* — McDermott Will & Emery LLP (57) ABSTRACT A capacitor including: a capacitor case having a bottom portion and an opening; a capacitor element accommodated in the capacitor case and including a first electrode E1 and a second electrode E2; a first fixed terminal T1 connected to the first electrode E1; a second fixed terminal T2 connected to the second electrode E2; a movable terminal partly accommodated in the capacitor case and including a free end; and a fixing portion that fixes a first portion of the movable terminal, wherein the first fixed terminal T1 and the second fixed terminal T2 each have an extending portion extending toward an outside of the capacitor case, the free end is led to the outside of the capacitor case, and the fixing portion fixes the first portion such that the free end extends in the extending direction of the extending portions.

14 Claims, 9 Drawing Sheets

CAPACITOR AND INVERTER

RELATED APPLICATIONS

This application claims the benefit of Japanese Application No. 2014-248265, filed on Dec. 8, 2014, the disclosure of which Application is incorporated by reference herein.

FIELD OF THE INVENTION

The present invention relates to capacitors, and more particularly to a capacitor for use in a motor driving inverter and the like of a hybrid automobile and the like.

BACKGROUND OF THE INVENTION

An inverter circuit control sensor, a smoothing capacitor, a noise absorbing capacitor connected in parallel with the smoothing capacitor, a snubber capacitor that absorbs noise between the inverter case and the ground, a power module including a switching element, a switching control substrate, and the like are housed in an inverter case of a motor driving inverter and the like of a hybrid automobile.

The power module receives supply of electric power from the smoothing capacitor. Furthermore, from the viewpoint of space saving, the power module and the capacitor are usually stacked when they are housed. In this case, the output terminal of the capacitor is extended from the stacked surface of the capacitor case toward the outside (Laid-Open Patent Publication No. 2007-12769).

BRIEF SUMMARY OF THE INVENTION

Aside from the output terminal of the capacitor, a movable terminal that is routed inside the inverter case and connected to a constituent element in the inverter case may be provided. In this case, it is necessary to avoid contact between the movable terminal and other constituent elements in the inverter case, and to prevent the movable terminal from being drawn under the other constituent elements. Furthermore, it is desired to minimize the space required for routing the movable terminal. As such, routing the movable terminal inside the inverter case requires various considerations, leading to a reduction in work efficiency.

A first aspect of the present invention relates to a capacitor including: a capacitor case having a bottom portion and an opening; a capacitor element accommodated in the capacitor case and including a first electrode E1 and a second electrode E2; a first fixed terminal T1 connected to the first electrode E1; a second fixed terminal T2 connected to the second electrode E2; a movable terminal partly accommodated in the capacitor case and including a free end; and a fixing portion that fixes a first portion of the movable terminal, wherein the first fixed terminal T1 and the second fixed terminal T2 each have an extending portion extending toward an outside of the capacitor case, the free end is led to the outside of the capacitor case, and the fixing portion fixes the first portion such that the free end extends in the extending direction of the extending portions.

A second aspect of the present invention relates to an inverter including: the above-described capacitor; a power module electrically connected to the capacitor and including a switching element; and an inverter case that accommodates the capacitor and the power module.

According to the present invention, the work efficiency in assembling an inverter including a capacitor and a movable terminal is improved.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

A capacitor according to the present invention includes: a capacitor case having a bottom portion and an opening; a capacitor element accommodated in the capacitor case and including a first electrode E1 and a second electrode E2; a first fixed terminal T1 connected to the first electrode E1; a second fixed terminal T2 connected to the second electrode E2; a movable terminal partly accommodated in the capacitor case and including a free end; and a fixing portion that fixes a first portion of the movable terminal, wherein the first fixed terminal T1 and the second fixed terminal T2 each have an extending portion extending toward an outside of the capacitor case, the free end is led to the outside of the capacitor case, and the fixing portion fixes the first portion such that the free end extends in the extending direction of the extending portions. This improves the work efficiency in accommodating the movable terminal and the capacitor in the inverter case.

When a component to which the extending portions are connected is stacked on the opening side of the capacitor case, it is preferable that the extending portions each extend from the opening perpendicularly to the bottom portion.

Preferably, the fixing portion is disposed near the opening of the capacitor case. The reason is that this facilitates adjustment of the extension length of the movable terminal in the extension direction and the position to which the movable terminal is extended. The operation of fixing the fixing portion to the capacitor case is also facilitated.

The capacitor may further include a temporary fixing portion that is extended from the fixing portion to the outside of the capacitor case in the extending direction of the extending portions. In this case, it is preferable that a second portion of the movable terminal is removably temporarily fixed to the temporary fixing portion. The reason is that this further facilitates adjustment of the extension length of the movable terminal in the extension direction and the position to which the movable terminal is extended. Furthermore, the work efficiency in assembling the inverter is further improved.

It is preferable that the fixing portion is a resin member including a first groove or a first rail, and the first portion is accommodated in the first groove or the first rail. The reason is that this facilitates molding of the fixing portion.

It is preferable that the fixing portion includes a protrusion in a portion that contacts the first portion, and the protrusion presses the first portion against an inner side of the first groove or the first rail. The reason is that this allows the movable terminal to be more firmly fixed.

It is preferable that the temporary fixing portion is a pillar-shaped body including a second groove or a second rail, and the second portion is accommodated in the second groove or the second rail. Furthermore, it is preferable that an inner side of a cross section, of the pillar-shaped body, that is perpendicular to the direction in which the pillar-shaped body is extended has a U-shape. The reason is that this facilitates molding.

It is preferable that the temporary fixing portion includes a protrusion in a portion that contacts the second portion, and the protrusion presses the second portion against an inner side of the second groove or the second rail. The reason is that this further facilitates temporary fixation (removal and attachment) of the movable terminal.

The extending portions of the first fixed terminal T1 and the second fixed terminal T2 may be in proximity to each other and insulated from each other by an insulating plate. In this case, it is preferable that the fixing portion is integrally formed with the insulating plate. The reason is that this reduces the number of the members, further improving the work efficiency. Furthermore, it is preferable that the temporary fixing portion is integrally formed with the insulating plate. For example, the insulating plate and the fixing portion and/or the temporary fixing portion may be formed as an integral resin molded article.

In order to protect the movable terminal, it is preferable that the capacitor case includes a protection portion that covers the fixing portion.

It is preferable that the above-described capacitor includes a thermoset resin that is filled inside the capacitor case so as to cover the capacitor element and not cover the extending portions of the first fixed terminal T1 and the second fixed terminal T2, and the free end. The reason is that this improves the moisture resistance and the vibration resistance of the capacitor element.

An inverter according to the present invention includes: the above-described capacitor; a power module electrically connected to the capacitor and including a switching element; and an inverter case that accommodates the capacitor and the power module.

Hereinafter, specific embodiments of a capacitor according to the present invention will be described with reference to the drawings.

Figure 5:
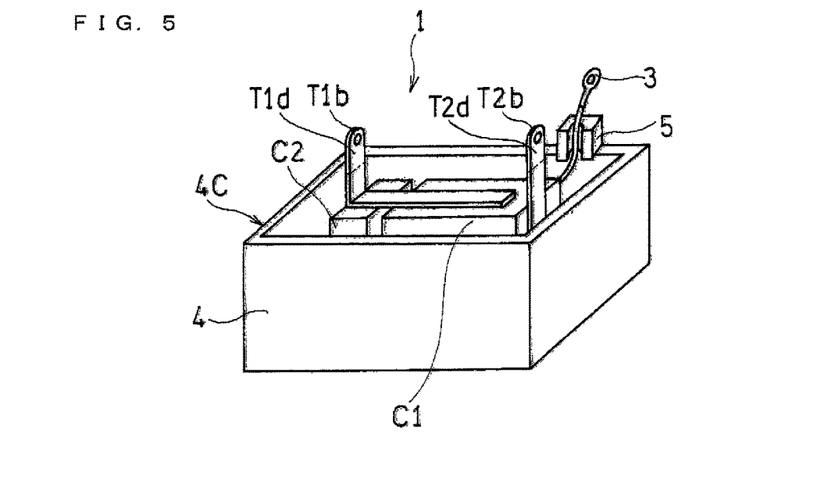
FIG. 5 is a perspective view showing an embodiment of the capacitor according to the present invention before resin sealing.

As shown in FIG. 5, a capacitor 1 includes capacitor elements C, a movable terminal 3, and a capacitor case 4 that accommodates these constituent elements.

The capacitor elements C each include a first electrode E1 and a second electrode E2. A first fixed terminal T1 is connected to the first electrode E1, and a second fixed terminal T2 is connected to the second electrode E2. The fixed terminals have bus bar portions Tc (T1c and T2c) connected to the electrodes, and extending portions Td (T1d and T2d) extending from the capacitor case 4 (see FIG. 2).

The movable terminal 3 has a free end, and the free end leads out from the capacitor case 4. The other end of the movable terminal 3 may be fixed inside the capacitor. For example, the other end may be connected to another fixed terminal having the same potential as the electrodes of the capacitor elements C.

In the following, the capacitor will be described in further detail, taking an example in which the capacitor elements C include a capacitor element C1 and a capacitor element C2 that exhibits an action different from that of the capacitor element C1, and the movable terminal 3 is connected to a third fixed terminal T3 that connects to a second electrode E22 of the capacitor element C2. Note that the capacitor according to the present invention is not limited thereto.

Figure 1:
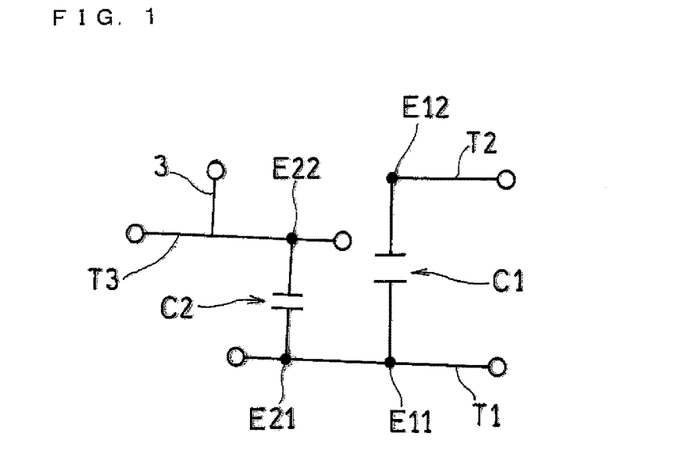
FIG. 1 is a circuit diagram showing an embodiment of a capacitor according to the present invention.

When the movable terminal is connected to the third fixed terminal T3, the capacitor 1 has a configuration as shown in the circuit diagram of FIG. 1, for example. That is, the first fixed terminal T1 is connected to the first electrode E11 of the capacitor element C1, and the second fixed terminal T2 is connected to the second electrode E12. The fixed terminals T1 and T2 are connected to an electronic device (not shown; for example, a power module) external to the capacitor.

The movable terminal 3 is connected to the third fixed terminal T3, and is also connected to a power module, for example. The third fixed terminal T3 is connected to an electronic device (e.g., a motor driving high-voltage battery) external to the capacitor. In this case, the movable terminal 3 is used for electrically connecting, for example, a car battery and a sensor (voltmeter) in the power module and measuring the voltage (voltage of the car battery) applied to the capacitor elements C from the car battery. Note that the first electrode E21 of the capacitor element C2 and the first electrode E11 of the capacitor element C1 have the same potential, and the second electrode E22 of the capacitor element C2 and the third fixed terminal T3 have the same potential.

Figure 2:
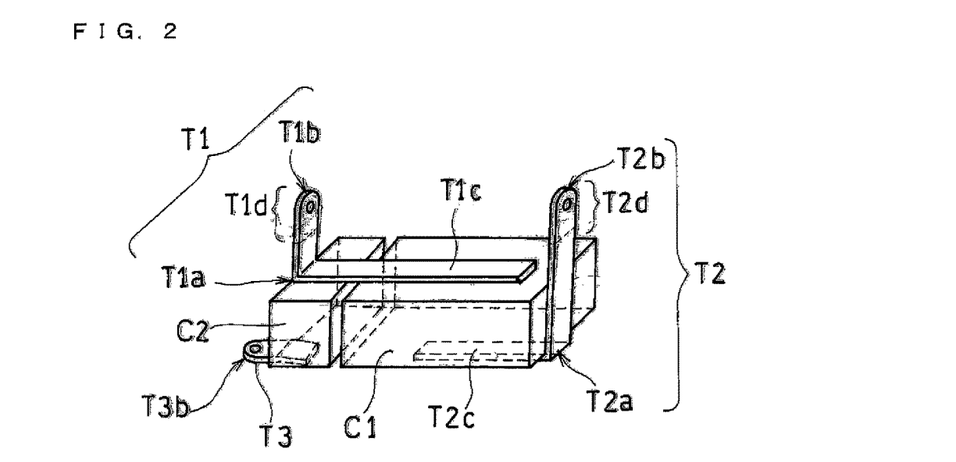
FIG. 2 is a perspective view showing an embodiment of a capacitor element according to the present invention.
Figure 3:
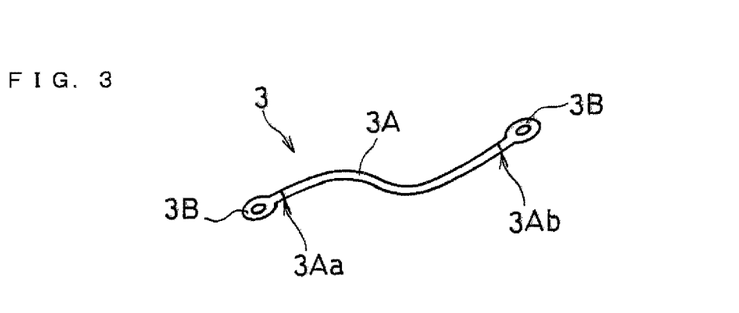
FIG. 3 is a top view showing an embodiment of a movable terminal according to the present invention.
Figure 4A:
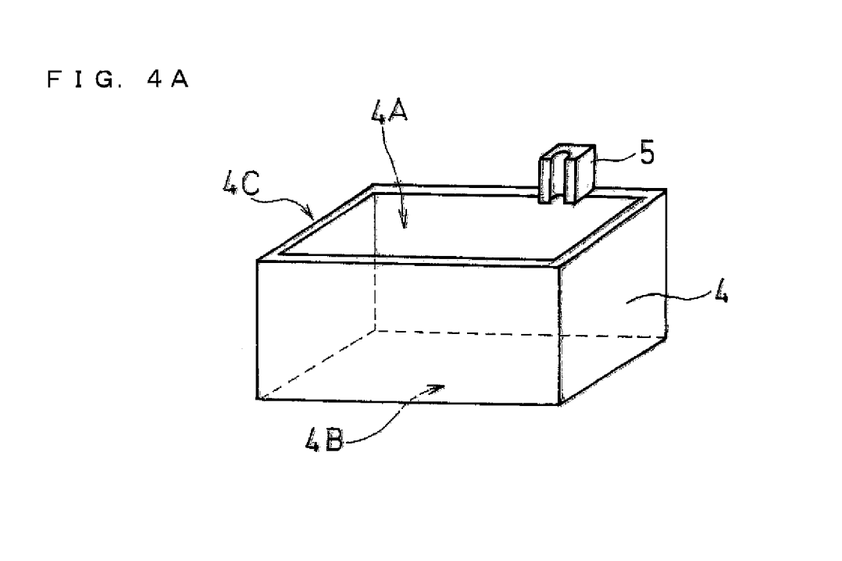
FIG. 4A is a perspective view showing an embodiment of a capacitor case with which a fixing portion is integrally formed, according to the present invention.
Figure 4B:
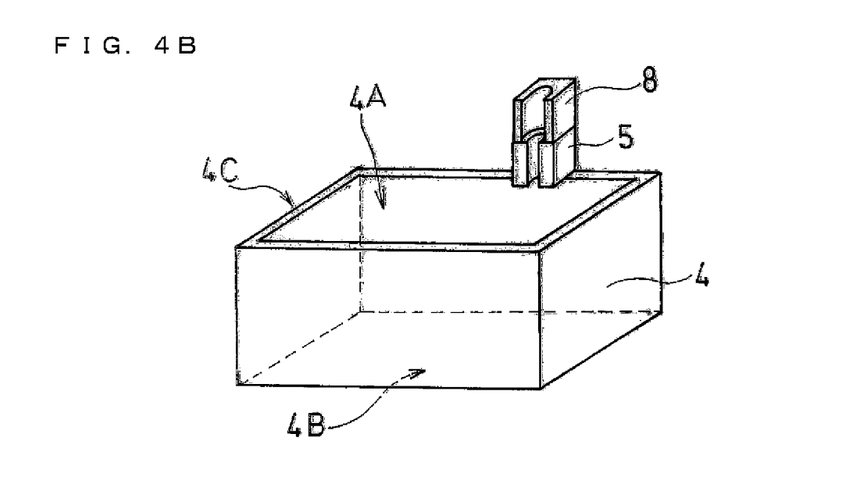
FIG. 4B is a perspective view showing another embodiment of a capacitor case with which a fixing portion is integrally formed, according to the present invention.

A specific configuration of the capacitor 1 shown in the circuit diagram of FIG. 1 will be described with reference to FIGS. 2 and 3. Note that the configuration of the capacitor 1 according to the present invention is not limited thereto. FIG. 2 shows the capacitor elements and the fixed terminal T, and FIG. 3 shows the movable terminal 3. FIG. 4A shows an example in which the fixing portion 5 is a resin member disposed near the opening of the capacitor case 4, and FIG. 4B shows an example in which the capacitor case 4 further includes a temporary fixing portion 8 extended from the fixing portion 5. FIG. 5 shows a state in which the capacitor elements C and a part of the movable terminal 3 are accommodated in the capacitor case 4 shown in FIG. 4A. Usually, a thermoset resin is filled inside the capacitor case 4 so as to seal the elements accommodated in the capacitor case.

[Capacitor Element]

The capacitor element C includes the capacitor elements C1 and C2. The capacitor elements C1 and C2 are connected in parallel, for example.

The capacitor element C1 includes a first electrode E11 and a second electrode E12. Each of the electrodes is a metal-sprayed electrode, for example. The first fixed terminal T1 is connected to the first electrode E11. The first fixed terminal T1 includes a bus bar portion T1c that connects to the first electrode E11, and a terminal portion, which is a region spanning from a bent portion T1a to an end portion T1b of the first fixed terminal T1. The terminal portion includes a first extending portion T1d including the end portion T1b and extending from the capacitor case 4 toward the outside so as to be exposed from the capacitor case 4. When the capacitor element C1 is constituted by a plurality of capacitor elements, the first electrodes of the capacitor elements are connected to one another by the bus bar portion T1c.

The second fixed terminal T2 is connected to the second electrode E12. The second fixed terminal T2 also similarly includes a bus bar portion T2c that connects to the second electrode E12, and a terminal portion, which is a region spanning from a bent portion T2a to an end portion T2b of the second fixed terminal T2. The terminal portion includes a second extending portion T2d including the end portion T2b and extending from the capacitor case 4 toward the outside so as to be exposed from the capacitor case 4. When the capacitor element C1 is constituted by a plurality of capacitor elements, the second electrodes of the capacitor elements are connected to one another by the bus bar portion T2c.

The capacitor element C2 also similarly includes a first electrode E21 and a second electrode E22 that are metal-sprayed electrodes, for example. The first electrode E21 is connected to the bus bar portion T1c, and has the same potential as the first electrode E11 of the capacitor element C1. The third fixed terminal T3 is connected to the second electrode E22, and the movable terminal 3 is connected to the third fixed terminal T3.

The extending portions (T1d, T2d) extend from the opening 4A of the capacitor case 4 toward the outside of the capacitor case 4 (see FIG. 5). The direction of extension may be any direction toward a component (e.g., a power module) to which the end portions Tb (T1b and T2b) are connected. Note that the direction of extension is the direction of a straight line $L_T$ that bisects a width W (length perpendicular to the extension direction of the fixed terminal T) of the extending portions Td.

Figure 6A:
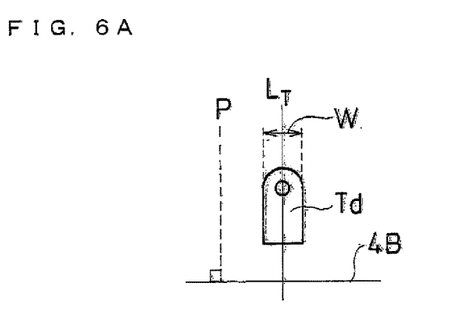
FIG. 6A is a diagram illustrating an extension direction of a fixed terminal.
Figure 6B:
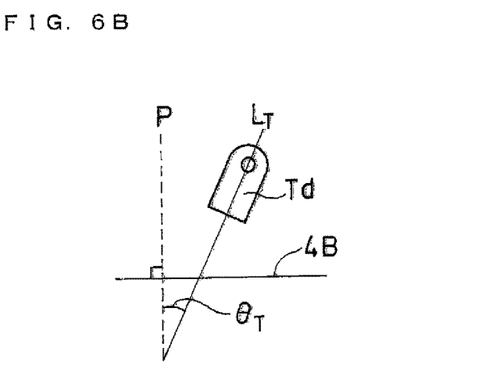
FIG. 6B is another diagram illustrating an extension direction of a fixed terminal.

When the power module is stacked on the opening 4A side of the capacitor case 4, it is preferable that the extending portions Td extend from the opening 4A of the capacitor case in a direction substantially perpendicular to the bottom portion 4B (see FIG. 5). Here, "substantially perpendicular to the bottom portion 4B" refers to a range within which an angle $\theta_T$ that the straight line $L_T$ forms with a perpendicular P of the bottom portion 4B is 0 to 20° (see FIGS. 6A and 6B). Although the example in which the extending portions Td extend in a direction substantially perpendicular to the bottom portion 4B will be mainly described and illustrated below as an example, the direction of extension of the extending portions Td is not limited to such a direction.

When the extending portions T1d and T2d extend in a direction substantially perpendicular to the bottom portion 4B, they may extend at the same angle $\theta_T$ (=0 to 20°), or may extend at different angles $\theta_T$ ranging from 0 to 20°. Although the extending portions T1d and T2d extend respectively from opposing sides of an opening end portion 4C in FIG. 5, the present invention is not particularly limited thereto. For example, the extending portions T1d and T2d may extend from the same side of the opening end portion 4C, or may extend respectively from two sides sharing a vertex. The extending portions T1d and T2d, when extended in proximity to each other from the same side of the opening end portion 4C, are preferably insulated from each other by an insulating plate or the like. A description of the insulating plate will be given later.

The number of first fixed terminals connected to the first electrode E1 and the number of the second fixed terminals connected to the second electrode E2 are not particularly limited. Each of the numbers of the fixed terminals may be 2 or more, and may be set as appropriate. It is sufficient that, among the fixed terminals, at least one first fixed terminal and at least one second fixed terminal extend in a direction toward the power module.

[Movable Terminal]

For example, the movable terminal 3 is constituted by one or more electric wires 3A housed in a tubular insulator (not shown), and has flexibility. The movable terminal 3 may be a harness composed of two or more electric wires housed in an insulator. The movable terminal 3 is, for example, a terminal for electrically connecting an external power supply such as a motor driving high-voltage battery to the power module. Connecting members 3B (e.g., ring-shaped metal components) for connecting the electric wire 3A to the third fixed terminal T3 and the power module are respectively attached to opposite end portions (3Aa, 3Ab) of the movable terminal 3.

Preferably, a large part (e.g., 70% or more and less than 90% of the length of the electric wire 3A) of the movable terminal 3 is routed inside the capacitor case 4. This makes it possible to omit the routing work performed inside the inverter case, thus further improving the work efficiency. Furthermore, the space for routing the movable terminal in the inverter case is reduced, making it possible to reduce the size of the inverter case.

The end portion 3Ab of the movable terminal 3, together with one connecting member 3B, is led to the outside of the capacitor case 4 (see FIG. 5). The other end portion 3Aa of the movable terminal 3 is electrically connected by, for example, welding the other connecting member 3B to the third fixed terminal T3. Note that the end portion 3Aa may be connected to an electronic device or the like external to the capacitor 1.

Figure 7:
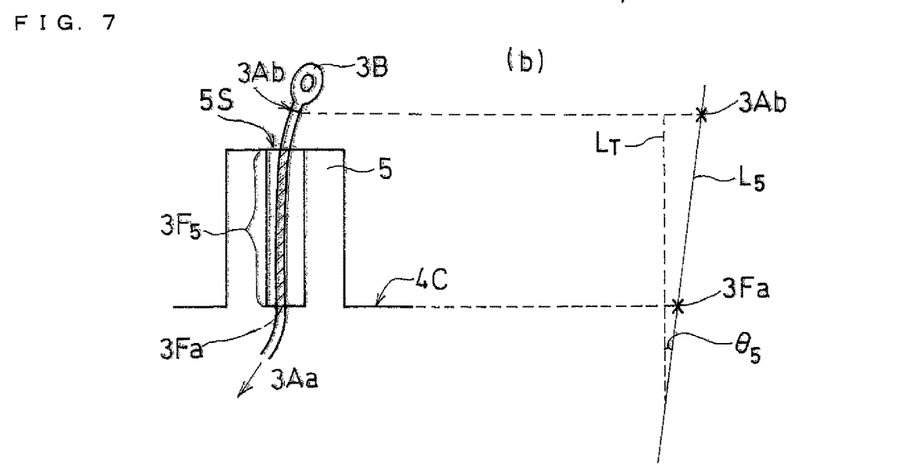
FIG. 7 is a diagram illustrating an extension direction of the movable terminal.

As shown in FIG. 7, a part (first portion $3F_5$) of the movable terminal 3 is fixed by the fixing portion 5, and the end portion 3Ab that is led to the outside is extended in the same direction as the extending portions T1$d$ and T2$d$. Here, "the end portion 3Ab is extended in the same direction as the extending portions T1$d$ and T2$d$" refers to a range within which an angle $\theta_5$ that the straight line $L_T$ forms with a straight line $L_5$ is 0 to 30°. The straight line $L_5$ is a straight line connecting an end portion 3Fa, of the first portion $3F_5$ of the movable terminal 3 that is fixed by the fixing portion 5, located closer to one end portion 3Aa of the movable terminal 3 with the other end portion 3Ab of the movable terminal in an unloaded condition.

By extending the movable terminal 3 having flexibility from the capacitor case 4 in the same direction as the extending portions Td, the work efficiency in assembling the inverter case is improved. That is, when a capacitor including a movable terminal is accommodated in an inverter case, it is possible to avoid contact between the movable terminal and other constituent elements accommodated in the inverter case, and to prevent the movable terminal from being drawn under the other constituent elements.

[Capacitor Case]

The capacitor case 4 has a bottom portion 4B and an opening 4A, and the opening 4A is defined by side end portions (opening end portions 4C) standing substantially vertically from the periphery of the bottom portion 4B of the capacitor case 4. The extending portions Td extend from the opening 4A in a direction toward the outside of the capacitor case. The capacitor case 4 has a size capable of entirely accommodating the capacitor elements C.

[Fixing Portion]

The fixing portion 5 is a portion that firmly fixes and supports the movable terminal 3 so as to control the extension direction thereof. Preferably, the fixing portion 5 is disposed near the opening 4A of the capacitor case 4. Specifically, it is preferable that the fixing portion 5 is a resin member disposed so as to be continuous with the opening end portion 4C. The reason is that this enables the extension direction of the movable terminal 3 to be easily controlled. The resin member may be provided between the bottom portion 4B and the opening end portion 4C of the capacitor case 4, or may be provided so as to extend from the capacitor case 4 as shown in FIG. 4A.

The fixing portion 5 may be integrally formed with the capacitor case 4. Alternatively, the fixing portion 5 may be molded separately from the capacitor case 4, and fixed near the opening 4A of the capacitor case 4. The shape and size of the fixing portion 5 are not particularly limited, as long as the fixing portion 5 has a size sufficient to form a later-described groove or rail for accommodating the first portion $3F_5$ of the movable terminal 3.

Figure 8A:
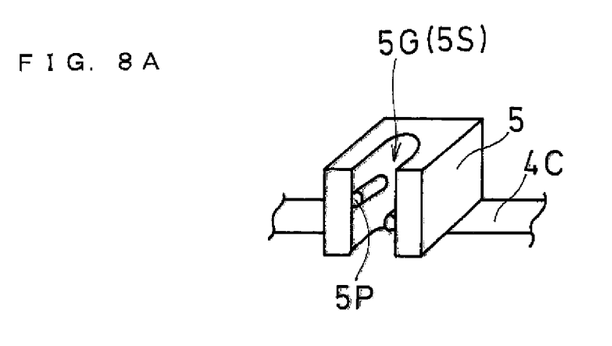
FIG. 8A is a perspective view showing an embodiment of a fixing portion according to the present invention.
Figure 8B:
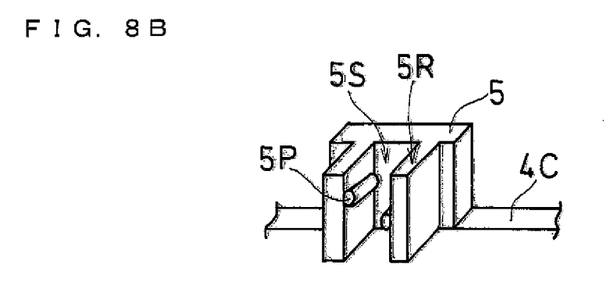
FIG. 8B is a perspective view showing another embodiment of a fixing portion according to the present invention.
Figure 8C:
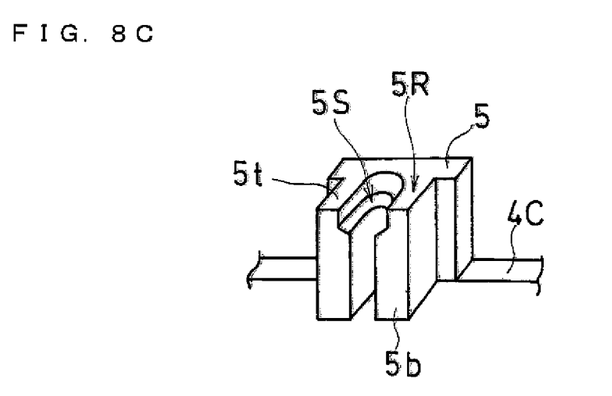
FIG. 8C is a perspective view showing a still another embodiment of a fixing portion according to the present invention.

For example, the fixing portion 5 has a groove (first groove 5G) or a rail (first rail 5R) (see FIGS. 8A to 8C). A part (first portion $3F_5$) of the movable terminal 3 is accommodated and fixed in the first groove 5G or the first rail 5R. Note that the shape of the part in which the movable terminal 3 is accommodated is not limited thereto, and may, for example, have a shape in which an end face of the rail in the height direction is inwardly bent, or have a shape such that the rail is discontinuously formed. The size and the length of the first groove 5G and the first rail 5R are not particularly limited, as long as they are sufficient to accommodate, fix, and support the first portion $3F_5$.

Figure 15:
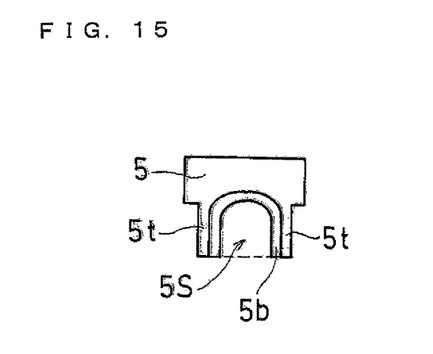
FIG. 15 is a top view showing an embodiment of the fixing portion according to the present invention.

In a space 5S formed by the fixing portion 6 for accommodating the movable terminal 3, the cross-sectional area of a cross section perpendicular to a longitudinal direction (extension direction) of the movable terminal 3 to be accommodated need not be constant in the longitudinal direction. FIG. 15 shows a top view of the fixing portion 5 shown in FIG. 8C, as viewed from this longitudinal direction. As shown in FIG. 15, it is possible to more reliably fix the movable terminal 3 by, for example, forming the space near one end face 5$b$ of the fixing portion 5 in the longitudinal direction to be smaller than the space near the other end face 5$t$.

The shape of the fixing portion 5 is also not particularly limited. In particular, it is preferable that the inner side of a cross section of the fixing portion 5 that is perpendicular to the above-described longitudinal direction has a U-shape in terms of ease of molding (see FIG. 15). A U-shape is, for example, a shape in which the inner surface of the fixing portion 5 forms a gradual curve as shown in FIG. 15.

Preferably, the fixing portion 5 includes a plurality of protrusions 5P in a portion that contacts the first portion $3F_5$ (see FIGS. 8A and 8B). The movable terminal 3 can be more firmly fixed by the plurality of protrusions 5P pressing the first portion $3F_5$ against the inner surface of the first groove 5G or the first rail 5R. The shape of the protrusions 5P is not particularly limited, and examples thereof include a semi-circular columnar shape, a trapezoidal shape, and a triangular shape. The number of the protrusions 5P is also not particularly limited, and may be set as appropriate according to the size or the like of the fixing portion 5 and the protrusions 5P.

[Temporary Fixing Portion]

Furthermore, it is preferable that a temporary fixing portion 8 extended from the fixing portion 5 is provided (see FIG. 4B). As a result of the movable terminal 3 being fixed to the fixing portion 5 and the temporary fixing portion 8, it is possible to prevent breaking of the movable terminal caused by an external load, such as vibrations during transportation, being locally exerted on the fixing portion 5.

Figure 9:
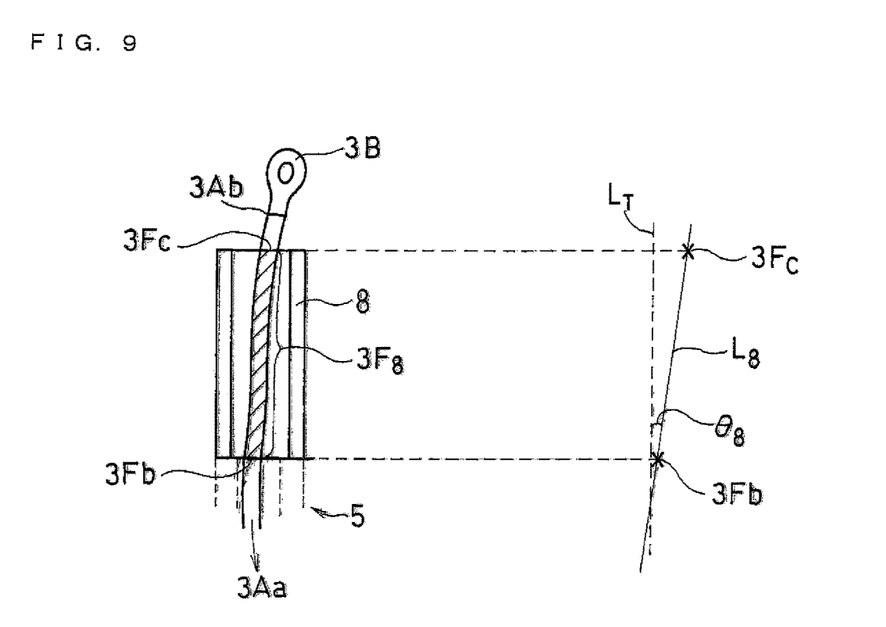
FIG. 9 is another diagram illustrating an extended direction of a temporary fixing portion.

The temporary fixing portion 8 removably temporarily fixes a part (second portion $3F_8$) of the movable terminal 3 that is different from the first portion $3F_5$ fixed by the fixing portion 5 (see FIG. 9). "Removably" means, for example, that removal of the movable terminal 3 from the temporary fixing portion 8 and fixation of the movable terminal 3 to the temporary fixing portion 8 can be easily performed without application of a large load. For example, a space 8S of the temporary fixing portion 8 for accommodating the movable terminal 3 is larger than the space 5S of the fixing portion 5 (see FIGS. 10A and 10B). The length of the temporary fixing portion 8 in the extended direction may be longer than the length of the fixing portion 5 in the same direction.

The temporary fixing portion 8 is extended from the fixing portion 5 to the outside of the capacitor case 4, in the same direction as the extending portions Td (T1d and T2d) of the fixed terminals. Here, "in the same direction as the extending portions Td of the fixed terminals" refers to a range within which an angle $\theta_8$ that the straight line $L_T$ forms with a straight line $L_8$ is 0 to 20°. The straight line $L_8$ is a straight line connecting an end portion 3Fb, of the second portion $3F_8$ of the movable terminal 3 that is fixed by the temporary fixing portion 8, located closer to the end portion 3Aa of the movable terminal with an end portion 3Fc located closer to the end portion 3Ab when a part of the movable terminal 3 is temporarily fixed to the temporary fixing portion 8 (see FIG. 9).

Figure 10A:
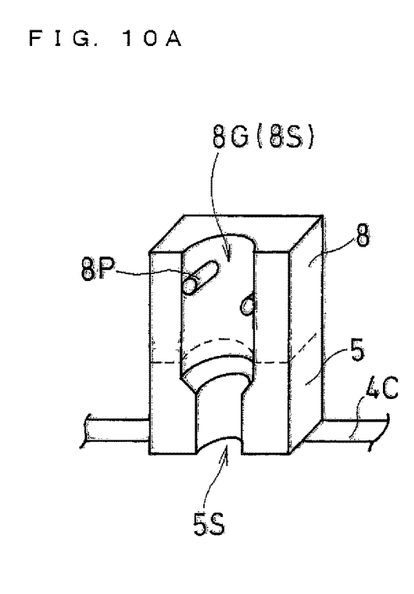
FIG. 10A is a perspective view showing an embodiment of the temporary fixing portion according to the present invention.
Figure 10B:
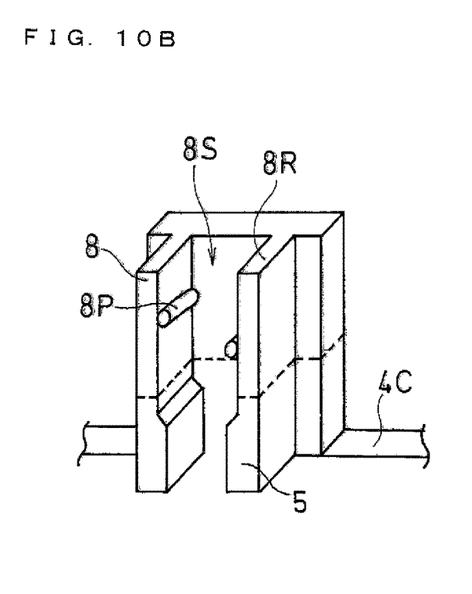
FIG. 10B is a perspective view showing another embodiment of the temporary fixing portion according to the present invention.

It is preferable that the temporary fixing portion 8 is a pillar-shaped body including a groove (second groove 8G) or a rail (second rail 8R) in terms of ease of molding (see FIGS. 10A and 10B). In this case, it is preferable that the shape of the inner side of the temporary fixing portion 8 and the shape of the inner side of the fixing portion 5 are the same. Furthermore, it is preferable that the second groove 8G or the second rail 8R and the first groove 5G or the first rail 5R formed in the fixing portion 5 are disposed continuously. That is, it is preferable that the second portion $3F_8$ of the movable terminal 3 that is accommodated in the second groove 8G or the second rail 8R is continuous with the first portion $3F_5$ accommodated in the first groove 5G or the first rail 5R.

Figure 16:
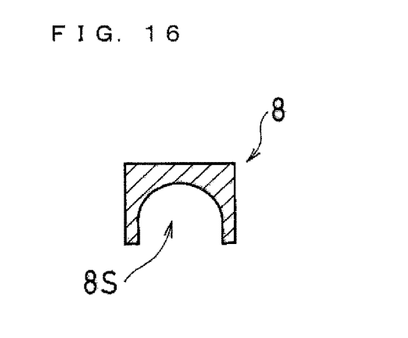
FIG. 16 is a cross-sectional view showing an embodiment of the temporary fixing portion according to the present invention.

When the temporary fixing portion 8 is a pillar-shaped body, it is preferable that the inner side of the cross section perpendicular to the extended direction (longitudinal direction) has a U-shape in terms of ease of molding (see FIG. 16). The U-shape includes shapes similar to those described above. The temporary fixing portion 8 may be integrally formed with the fixing portion 5, or may be formed separately therefrom. In particular, it is preferable that the temporary fixing portion 8 is integrally formed with the fixing portion 5 in terms of work efficiency.

Preferably, the temporary fixing portion 8 includes a plurality of protrusions 8P in a portion that contacts the second portion $3F_8$. Temporary fixation of the movable terminal 3 is further facilitated by the plurality of protrusions 8P pressing the second portion $3F_8$ against the inner surface of the second groove 8G or the second rail 8R. The shape of the protrusions 8P is not particularly limited, and examples thereof include a semicircular columnar shape, a trapezoidal shape, and a triangular shape. The number of the protrusions 8P is also not particularly limited, and may be set as appropriate according to the size or the like of the temporary fixing portion 8 and the protrusions 8P. From the viewpoint of removability, it is preferable that the protrusions 8P of the temporary fixing portion 8 are smaller in size or number than the protrusions 5P of the fixing portion 5.

[Insulating Plate]

Figure 11:
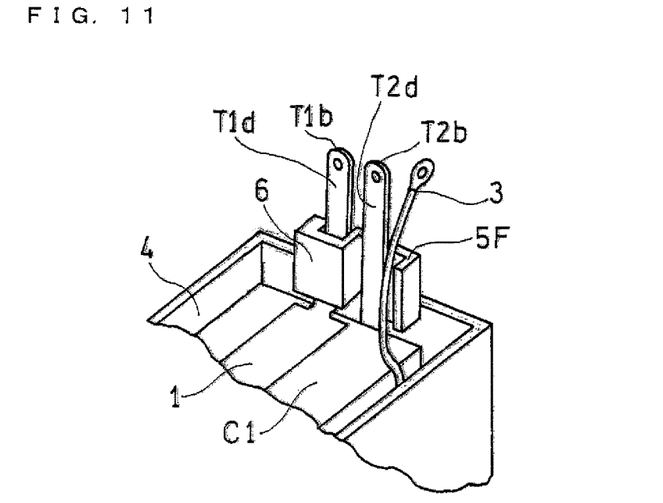
FIG. 11 is a perspective view showing an embodiment of an insulating plate according to the present invention.

When the extending portions Td of the fixed terminals are extended in proximity to each other from the same side of the opening end portion 4C by using an insulating plate 6 (e.g., a resin member) as described above, the insulating plate 6 and the fixing portion 5 may be formed integrally (see FIG. 11). Consequently, fewer components are required than when the insulating plate 6 and the fixing portion 5 are formed separately, further improving the work efficiency during manufacture.

The shape of the insulating plate 6 is not particularly limited, and may be any shape as long as the insulating plate is partly interposed between the two extending portions so as to prevent contact between the two extending portions. For example, as shown in FIGS. 12A to 12D, a bent portion for determining the positions of the extending portions Td may be formed in the insulating plate 6, and the extending portions T1d and T2d may be brought into contact respectively with different major surfaces of the insulating plate 6. Alternatively, two insertion openings formed in a direction parallel to the major surfaces of the insulating plate 6 for inserting the respective extending portions may be provided inside the insulating plate 6.

Figure 12A:
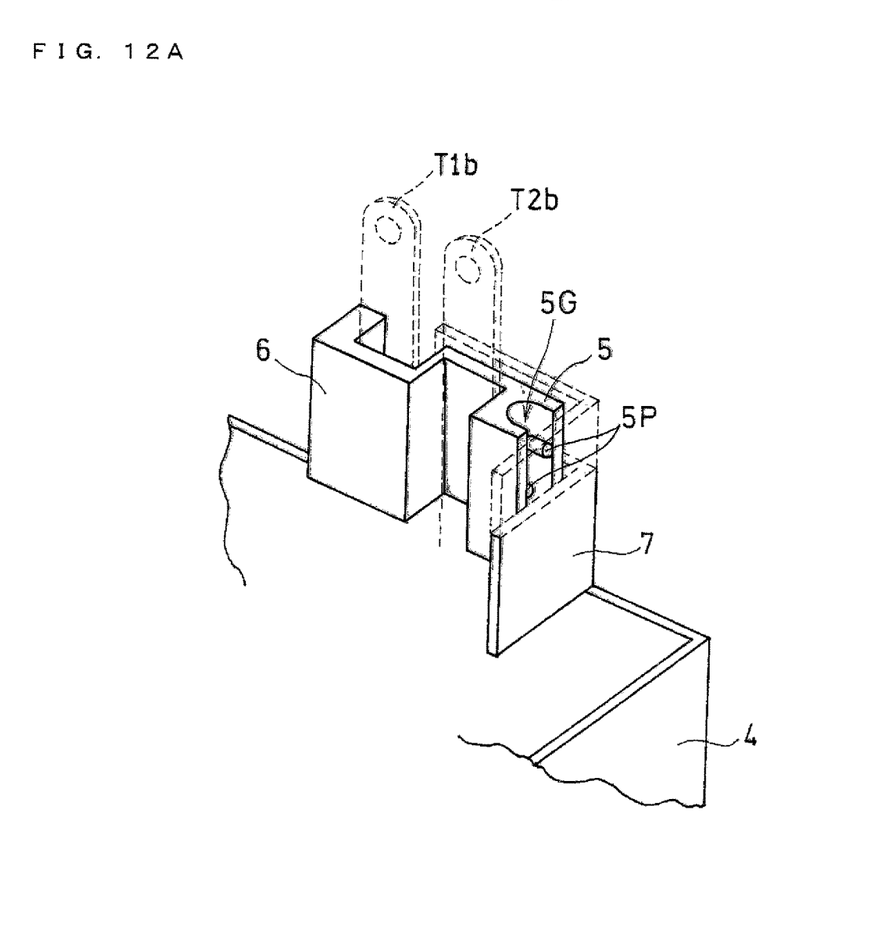
FIG. 12A is a perspective view showing another embodiment of the insulating plate with which a fixing portion is integrally formed, according to the present invention.
Figure 12B:
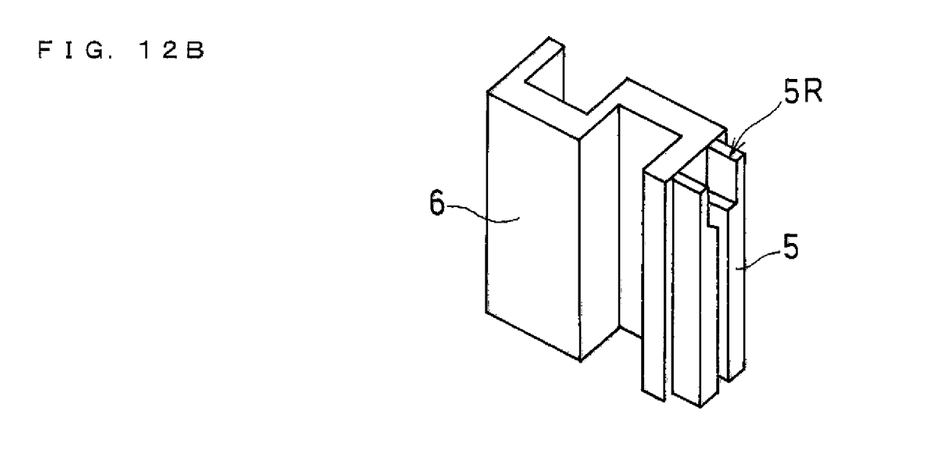
FIG. 12B is a perspective view showing another embodiment of the insulating plate with which the fixing portion is integrally formed, according to the present invention.

Preferably, the fixing portion 5 is formed on an end face of the insulating plate 6 (see FIGS. 12A to 12D). The reason is that this makes it easier to avoid contact between the end portion 3Ab of the movable terminal and the extending portions Td of the fixed terminal. For the sake of convenience, FIG. 12A only shows a part of the capacitor case 4, a part of a protection portion 7, which will be described later, the insulating plate 6 and the fixing portion 5. FIG. 12B only shows the insulating plate 6 and the fixing portion 5, and FIGS. 12C and 12D only show a part of the insulating plate 6 and a part of the fixing portion 5.

Figure 12C:
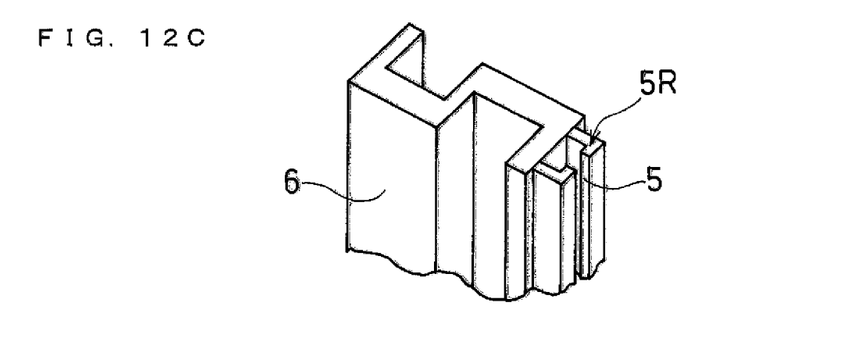
FIG. 12C is a perspective view showing a still another embodiment of the insulating plate with which the fixing portion is integrally formed, according to the present invention.
Figure 12D:
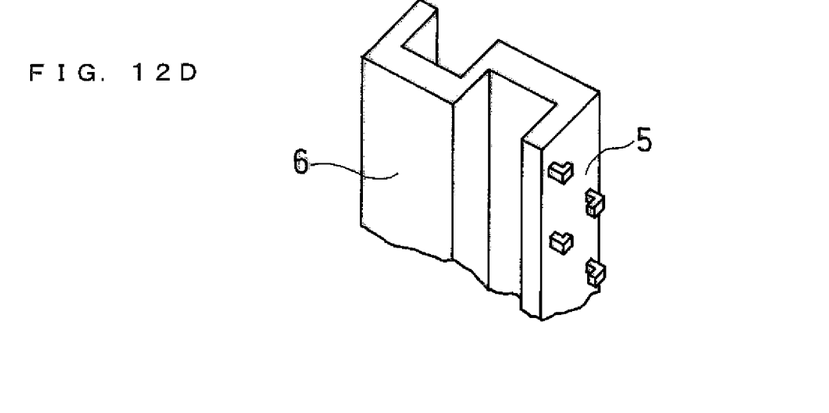
FIG. 12D is a perspective view showing a still another embodiment of the insulating plate with which the fixing portion is integrally formed, according to the present invention.

FIG. 12A shows an example in which the fixing portion 5 integrally formed with the insulating plate 6 includes a groove (first groove 5G). FIG. 12B shows an example in which the fixing portion 5 includes a rail (first rail 5R), and FIG. 12C shows a modification thereof. In FIG. 12C, the end face of the first rail 5R that does not contact the insulating plate 6 has an inwardly bent shape. In FIG. 12D, the fixing portion 5 has the first rail 5R shown in FIG. 12C that is formed discontinuously. The fixing portion 5 may include a plurality of protrusions 5P (see FIG. 12A). The protrusions 5P are the same as those described above.

Figure 13A:
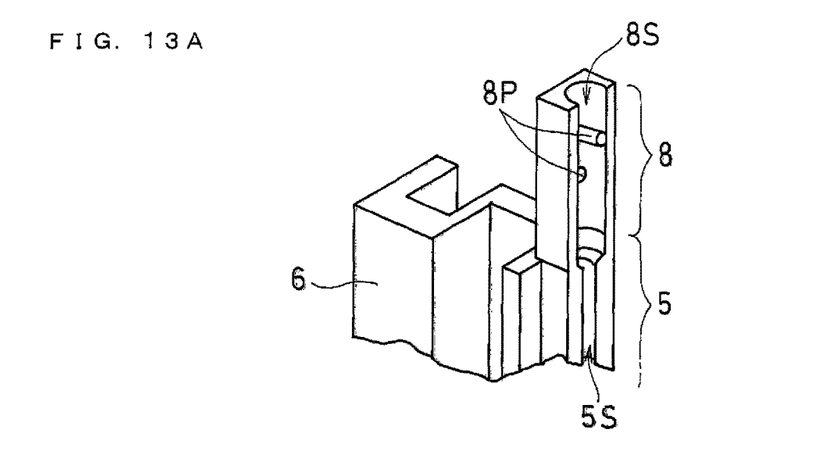
FIG. 13A is a perspective view showing an embodiment of the insulating plate with which the fixing portion and the temporary fixing portion are integrally formed, according to the present invention.
Figure 13B:
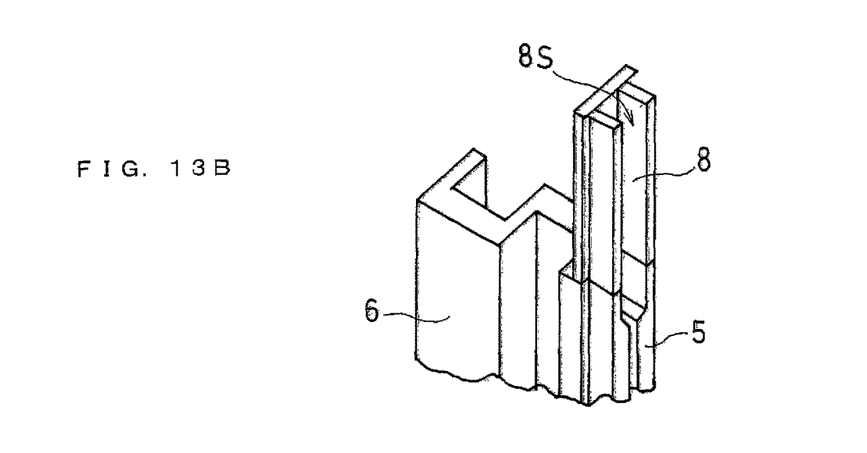
FIG. 13B is a perspective view showing another embodiment of the insulating plate with which the fixing portion and the temporary fixing portion are integrally formed, according to the present invention.
Figure 13C:
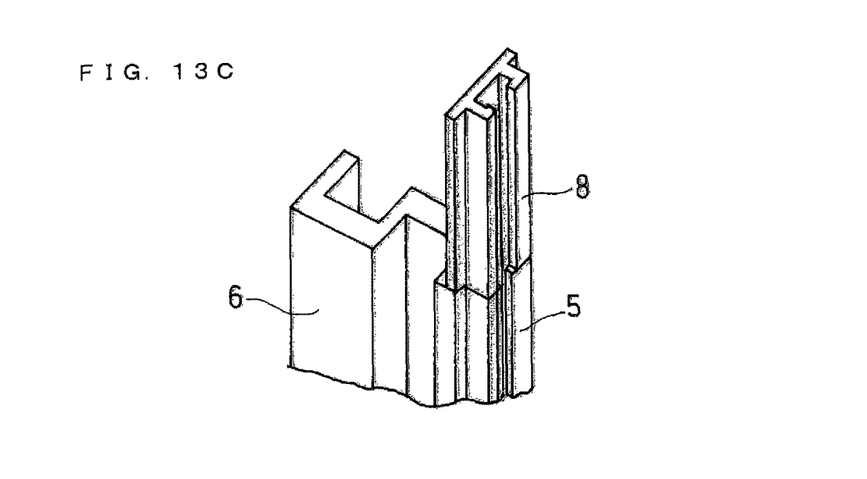
FIG. 13C is a perspective view showing a still another embodiment of the insulating plate with which the fixing portion and the temporary fixing portion are integrally formed, according to the present invention.
Figure 13D:
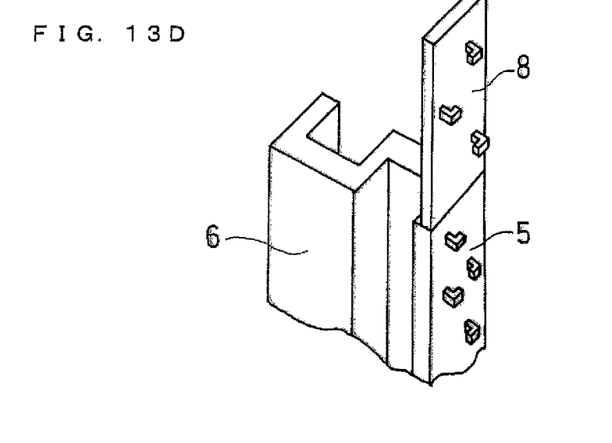
FIG. 13D is a perspective view showing a still another embodiment of the insulating plate with which the fixing portion and the temporary fixing portion are integrally formed, according to the present invention.

Preferably, the insulating plate 6 is further provided with a temporary fixing portion 8. In this case, it is preferable that the temporary fixing portion 8 is extended from the fixing portion 5. For example, the temporary fixing portion 8 may be disposed along the end face of the insulating plate 6 on which the fixing portion 5 is formed (see FIGS. 13A to 13D). In this case, it is preferable, from the viewpoint of removability, that the space 8S formed by the temporary fixing portion 8 for accommodating the movable terminal 3 is larger than the space 5S formed by the fixing portion 5. FIGS. 13B to 13D show exemplary shapes of the temporary fixing portion 8 corresponding to the fixing portions 5 shown in FIGS. 12B to 12D.

[Protection Portion]

When the fixing portion 5 is formed on the insulating plate 6, it is preferable that a protection portion 7 (see FIG. 12A) for covering the fixing portion 5 is formed on the capacitor case 4. This makes it further easier to avoid contact between the movable terminal 3 accommodated in the fixing portion 5 and other constituent members accommodated in the inverter. Although the size and the shape of the protection portion 7 are not particularly limited, a size and a shape that can cover the entire fixing portion 5 are particularly preferable. When the insulating plate 6 includes the temporary fixing portion 8, it is preferable that the protection portion 7 has a size and a shape that do not cover the temporary fixing portion 8 from the viewpoint of removability. For the sake of convenience, the upper part of the protection portion 7 is depicted by the broken line in FIG. 12A.

[Thermoset Resin]

A thermoset resin (not shown) may be filled inside the capacitor case 4 so as to cover the capacitor elements C and not cover the extending portions Td of the fixed terminals and the free end (end portion 3Ab) of the movable terminal 3. This improves the moisture resistance and the vibration resistance of the capacitor element C. In this case, the temporary fixing portion 8 needs to be disposed at a position that is not covered by the thermoset resin.

[Inverter]

Figure 14:
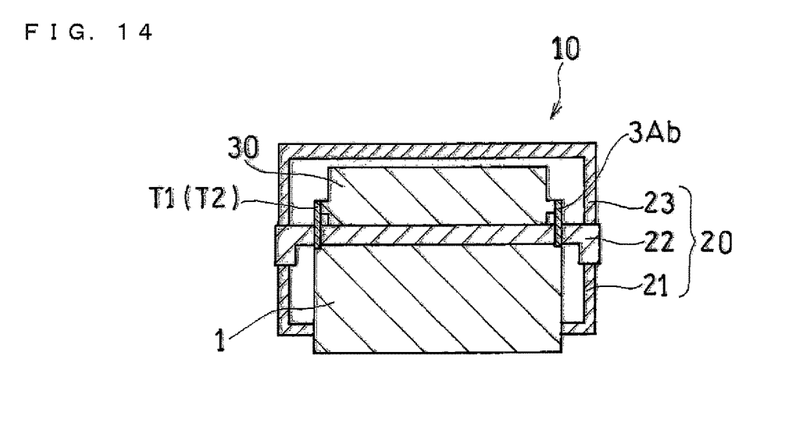
FIG. 14 is a cross-sectional view showing an embodiment of an inverter according to the present invention.

An inverter 10 according to the present invention includes an inverter case 20, the capacitor 1 described above, and a power module 30. The capacitor 1 and the power module 30 are accommodated in the inverter case 20 (see FIG. 14). The capacitor 1 may be entirely housed in the inverter case 20, or the capacitor 1 may be partly exposed from the inverter case 20 as shown in FIG. 14.

The capacitor 1 and the power module 30 are electrically connected by the fixed terminals T1, T2, and also T3. The power module 30 includes a switching element (not shown).

The inverter case 20 includes, for example, a lower case 21 and a middle case 22 in which the capacitor 1 is fitted and accommodated, and an upper case 23 that accommodates the power module 30. The middle case 22 includes a bottom portion interposed between the capacitor 1 and the power module 30, and one or more through holes are provided in the bottom portion. The extending portions T1$d$ and T2$d$ connect to the power module 30 accommodated in the upper case 23 through the through hole(s). The free end of the movable terminal 3 also connects to the power module 30 through the through hole through which the extending portion T1$d$ and/or T2$d$ is passed, or through another through hole. The free end of the movable terminal 3 extends in the same direction as the extending portions Td and is accommodated in the fixing portion 5, and further in the temporary fixing portion 8, and therefore can be easily inserted into the through hole of the middle case 22. Consequently, contact between the movable terminal 3 and the middle case 22 can be easily avoided, and therefore, a reduction in insulation caused by damage to the insulator of the movable terminal 3 can be suppressed.

Hereinafter, the movable terminal, the capacitor case, the capacitor element, the thermoset resin, and the inverter case will be described in further detail.

[Movable Terminal]

The movable terminal 3 is constituted by, for example, housing one or more electric wires 3A (e.g., copper wires) in a tubular insulator (not shown). The movable terminal 3 may be a harness composed of two or more electric wires housed in the insulator. The electric wire 3A may be housed in the tubular insulator after being coated with an insulating material such as a fluorocarbon resin.

Near the connection portion between the connecting members 3B and the electric wire 3A of the movable terminal 3, a protection member (not shown) for protecting the connection portion may be disposed. Examples of the protection member include a tubular material of heat-shrinkable polyolefin, polyvinyl chloride, polyester, a fluorocarbon resin, and the like. The tubular insulator protects the electric wire 3A from external factors, and the material thereof is not particularly limited. Examples of the material of the tubular insulator include polyester and glass fiber.

[Capacitor Case]

The capacitor case 4 has a size sufficient to entirely accommodate the capacitor elements C (e.g., C1 and C2). Furthermore, it is preferable that the capacitor case 4 has a size that enables a thermoset resin to cover the entire surface of the capacitor elements C when the resin has been filled inside the capacitor case 4. The material of the capacitor case 4 is not particularly limited. In particular, polyphenylene sulfide (PPS) or the like is preferable in terms of heat resistance.

[Capacitor Element]

The capacitor element C includes, for example, a capacitor element C1 and a capacitor element C2 that exhibits an action different from that of the capacitor element C1. The capacitor elements C may be any capacitor element that exhibits a known action as the capacitor element incorporated in an inverter, and may be, for example, a smoothing capacitor that smoothes a voltage, a filter capacitor that extracts a specific frequency component, a snubber capacitor, or the like. The capacitor elements C may include one each of the capacitor elements that exhibit these actions or two or more of each of these capacitor elements. For example, the capacitor element C1 is a smoothing capacitor, and the capacitor element C2 is a filter capacitor. The capacitor elements C may further include a snubber capacitor connected in parallel with the smoothing capacitor.

The type of the capacitor elements C is not particularly limited, and examples thereof include a film capacitor, a tantalum capacitor, and an aluminum electrolytic capacitor. In particular, a film capacitor is preferable in that it has a small dielectric loss and a high withstanding voltage.

Film capacitors are known to use, as the electrode, a metal foil or a metalized film obtained by vapor-depositing a metal onto a resin film. Of these, a film capacitor using a metalized film as the electrode is preferably used in terms being easy to miniaturize and light weight. A metalized film can be obtained by vapor-depositing a metal onto one side of a resin film in a predetermined pattern. An electrode pair can be formed by placing two metalized films thus obtained such that their metal deposited surfaces are opposed with the resin films interposed therebetween. The formed electrode pair is wound as is. Alternatively, the electrode pair is cut into a predetermined shape, and a plurality of cut electrode pairs are stacked. Of these, a wound-type electrode is preferable in terms of ease of manufacture.

The material of the resin film is not particularly limited, and examples thereof include polypropylene, polyethylene terephthalate, polyethylene naphthalate, polyphenyl sulfide, and polystyrene. Of these, polypropylene is preferable in that it has a particularly small dielectric loss.

The metal that is vapor-deposited onto the resin film is also not particularly limited, and examples thereof include aluminum, zinc, tin, magnesium, and alloys thereof. Of these, it is preferable to use aluminum in terms of excellent corrosion resistance.

For example, a metal-sprayed electrode is formed on an end face perpendicular to a major surface of a group of stacked electrodes or on an end face of a wound electrode, to produce a capacitor element C. A first fixed terminal T1 is connected to a first electrode E1 of the capacitor element C. The first fixed terminal T1 includes a bus bar portion T1$c$ that connects to the first electrode E1 and a terminal portion, which is a region spanning from a bent portion T1$a$ to an end portion T1$b$ of the first fixed terminal T1. A part of the terminal portion is a first extending portion T1$d$ extending from the capacitor case 4. The bus bar portion T1$c$ and the terminal portion can be formed by, for example, bending a metal plate made of copper.

When the capacitor element C is constituted by a plurality of capacitor elements, first electrodes E1 of the capacitor elements are connected to one another by the bus bar portion T1$c$, for example.

A second electrode E2 of each of the capacitor elements C is connected to a second fixed terminal T2. The second fixed terminal T2 includes a bus bar portion T2c that connects to the second electrode E2, and a terminal portion, which is a region spanning from a bent portion T2a to an end portion T2b of the second fixed terminal T2. A part of the terminal portion is a second extending portion T2d extending from the capacitor case 4. The bus bar portion T2c and the terminal portion may also similarly be formed by bending a metal plate made of copper.

A third fixed terminal T3 may be further connected to the second electrode E2 of the capacitor element C. The movable terminal 3 may be connected to the third fixed terminal T3.

[Thermoset Resin]

The thermoset resin filled inside the capacitor case is not particularly limited, and examples thereof include an epoxy resin, a silicone resin, and a phenol resin. Of these, an epoxy resin is preferable in terms of strength.

The filling amount of the thermoset resin, while not particularly limited, is an amount that can entirely cover the surface of the capacitor element C accommodated in the capacitor case but does not cover the extending portion Td of the fixed terminal and the end portion 3Ab of the movable terminal. The fixing portion 5 may be partly or entirely covered with the thermoset resin. When a temporary fixing portion 8 is disposed, it is desirable that the temporary fixing portion 8 is not entirely covered with the thermoset resin.

[Inverter Case]

The inverter case 20 has a size sufficient to partly or entirely accommodate the capacitor 1 and the power module 30. The material of the inverter case 20 is not particularly limited, and examples thereof include aluminum and the like. The inverter case is produced by, for example, high pressure casting (die casting) such a metal.

The capacitor of the present invention can be mounted in a motor driving inverter and the like of a hybrid automobile and the like.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A capacitor comprising:
a capacitor case having a bottom portion and an opening;
a capacitor element accommodated in the capacitor case and including a first electrode E1 and a second electrode E2;
a first fixed terminal T1 connected to the first electrode E1;
a second fixed terminal T2 connected to the second electrode E2;
a movable terminal partly accommodated in the capacitor case and including a free end; and
a fixing portion that fixes a first portion of the movable terminal,
wherein the first fixed terminal T1 and the second fixed terminal T2 each have an extending portion extending toward an outside of the capacitor case,
the free end is led to the outside of the capacitor case, and the fixing portion is disposed on the capacitor case and secures the first portion such that the free end extends in the extending direction of the extending portions.

2. The capacitor in accordance with claim 1, wherein the extending portions each extend from the opening perpendicularly to the bottom portion.

3. The capacitor in accordance with claim 1, wherein the fixing portion is disposed near the opening of the capacitor case.

4. The capacitor in accordance with claim 3, further comprising:
a temporary fixing portion that is extended from the fixing portion to the outside of the capacitor case in the extending direction of the extending portions,
wherein a second portion of the movable terminal is removably temporarily fixed to the temporary fixing portion.

5. The capacitor in accordance with claim 3,
wherein the fixing portion is a resin member including a first groove or a first rail, and
the first portion is accommodated in the first groove or the first rail.

6. The capacitor in accordance with claim 5,
wherein the fixing portion includes a protrusion in a portion that contacts the first portion, and
the protrusion presses the first portion against an inner side of the first groove or the first rail.

7. The capacitor in accordance with claim 4,
wherein the temporary fixing portion is a pillar-shaped body including a second groove or a second rail, and
the second portion is accommodated in the second groove or the second rail.

8. The capacitor in accordance with claim 7, wherein an inner side of a cross section, of the pillar-shaped body, that is perpendicular to the direction in which the pillar-shaped body is extended has a U-shape.

9. The capacitor in accordance with claim 7,
wherein the temporary fixing portion includes a protrusion in a portion that contacts the second portion, and
the protrusion presses the second portion against an inner side of the second groove or the second rail.

10. The capacitor in accordance with claim 3,
wherein the extending portions of the first fixed terminal T1 and the second fixed terminal T2 are in proximity to each other and insulated from each other by an insulating plate, and
the fixing portion is integrally formed with the insulating plate.

11. The capacitor in accordance with claim 10, wherein the temporary fixing portion is integrally formed with the insulating plate.

12. The capacitor in accordance with claim 10, wherein the capacitor case includes a protection portion that covers the fixing portion.

13. The capacitor in accordance with claim 1, comprising a thermoset resin that is filled inside the capacitor case so as to cover the capacitor element and not cover the extending portions of the first fixed terminal T1 and the second fixed terminal T2, and the free end.

14. An inverter comprising:
the capacitor in accordance with claim 1;
a power module electrically connected to the capacitor and including a switching element; and
an inverter case that accommodates the capacitor and the power module.

* * * * *